US008228918B2

(12) United States Patent
Kennedy et al.

(10) Patent No.: US 8,228,918 B2
(45) Date of Patent: Jul. 24, 2012

(54) METHOD, COMMUNICATIONS SYSTEM AND COMMUNICATIONS TERMINAL FOR ESTABLISHING COMMUNICATION

(75) Inventors: Stephan Kennedy, Windach (DE); Thomas Stach, Vienna (AT)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 1488 days.

(21) Appl. No.: 11/796,721

(22) Filed: Apr. 27, 2007

(65) Prior Publication Data
US 2007/0280467 A1 Dec. 6, 2007

(30) Foreign Application Priority Data

Apr. 28, 2006 (EP) ..................................... 06008955

(51) Int. Cl.
*H04L 12/56* (2006.01)
*H04L 12/66* (2006.01)
*H04M 11/00* (2006.01)
(52) U.S. Cl. ..................... 370/395.2; 370/410; 370/352; 370/356; 379/93.32
(58) Field of Classification Search .................. 370/401, 370/395.2, 346, 260, 432, 352–356, 496, 370/395.21, 453, 373, 377, 384, 410, 524; 709/245, 220, 206, 230–237, 243; 379/22, 379/22.02, 23, 27.02, 32.01, 31, 93.09, 93.26, 379/93.28, 93.32, 201.07, 201.12, 82; 455/400–401
See application file for complete search history.

(56) References Cited

U.S. PATENT DOCUMENTS

| 6,256,305 | B1 * | 7/2001 | Chau et al. ..................... 370/352 |
| 6,577,638 | B1 * | 6/2003 | Tashiro et al. ................. 370/401 |
| 7,227,865 | B2 * | 6/2007 | Shaheen et al. ........... 370/395.21 |
| 7,257,109 | B2 * | 8/2007 | Sylvain ......................... 370/352 |
| 7,483,989 | B2 * | 1/2009 | Williams et al. .............. 709/227 |
| 7,542,461 | B2 * | 6/2009 | Oran ............................. 370/352 |
| 7,760,707 | B1 * | 7/2010 | Bates ............................ 370/352 |
| 2001/0005372 | A1 * | 6/2001 | Cave et al. .................... 370/401 |
| 2002/0041588 | A1 * | 4/2002 | Gleneck ....................... 370/352 |
| 2003/0055982 | A1 * | 3/2003 | Noro et al. .................... 709/227 |
| 2003/0219006 | A1 * | 11/2003 | Har ............................... 370/352 |
| 2004/0004957 | A1 * | 1/2004 | Rabipour et al. ............. 370/352 |
| 2004/0184468 | A1 * | 9/2004 | Miao ............................. 370/401 |
| 2005/0100008 | A1 * | 5/2005 | Miyata et al. ................. 370/389 |
| 2005/0105510 | A1 * | 5/2005 | Reding et al. ................. 370/352 |
| 2005/0111459 | A1 | 5/2005 | Stampfl et al. |
| 2005/0141541 | A1 * | 6/2005 | Cuny et al. .................... 370/437 |
| 2007/0058609 | A1 * | 3/2007 | Goel et al. .................... 370/352 |

OTHER PUBLICATIONS

International Telecommunication Union, Draft revised H.323 version 6, "Packet-based multimedia communications systems" Geneva, Apr. 3-13, 2006, pp. i-vii, 92-142, 267-291, Study Group 16, TDQQQ(PLEN/16), Study Period 2005-2008, XP002399492.
J. Rosenberg, H. Schulzrinne, G. Camarillo, A. Johnston, J. Peterson, R. Sparks, M. Handley, E. Schooler, "SIP: Session Initiation Protocol", Network Working Goup, Jun. 2002, pp. 1-240, Request for Comments: 3261, Obsoletes: 2543, Category Standards Track.

* cited by examiner

*Primary Examiner* — Asad M Nawaz
*Assistant Examiner* — Wutchung Chu (57) ABSTRACT

In one aspect, a method for establishing communication in a packet-oriented communications network between a calling (EG1) and a called terminal is provided. In the method, before a call-accepted signal by the called terminal, triggered by a message within the framework of call set-up signaling, a direct, first payload connection is established and maintained between the calling and the called terminal. As a direct result of the call-accepted signal of the called terminal communication is triggered between the calling and called terminal by means of the established first payload connection.

18 Claims, 5 Drawing Sheets

METHOD, COMMUNICATIONS SYSTEM AND COMMUNICATIONS TERMINAL FOR ESTABLISHING COMMUNICATION

CROSS REFERENCE TO RELATED APPLICATIONS

This application claims priority of European application No. 06008955.4 EP filed Apr. 28, 2006, which is incorporated by reference herein in its entirety.

FIELD OF INVENTION

The present invention relates to a method, a communications system and communications terminal for establishing communication.

BACKGROUND OF INVENTION

In modern communications systems it is known to transmit payload via packet-oriented networks. Payloads are, for example, digitized voice data, with the term "Voice over IP", or VoIP for short, being common for transmission of voice data via packet-oriented networks. The use of packet-oriented data transmission methods often results in losses in the quality of the payload being transmitted and these are often caused by conversions, delays or loss of payload packets in network nodes.

Based on the often used, so-called internet protocol, also abbreviated to IP, reference will be made hereinafter using the term "IP terminal" to communication terminals that operate on the basis of a packet-oriented transmission method.

In packet-oriented networks a connection between IP terminals can conventionally be routed via network nodes, such as what are known as routers, switches or gateways. In this connection routers switch data between packet-oriented sub-networks, while gateways can also provide a junction between different types of line-switched and/or packet-oriented networks.

With a connection between two IP terminals the payloads may be routed in particular via a plurality of gateways, it being possible for each additional gateway in a transmission path of the payloads to have an adverse effect on the payload quality—i.e. for example a voice quality. Furthermore, a distinction is often made with packet-oriented connections between signaling connections and payload connections, it being possible for signaling and payload connections between two IP terminals to have different connection paths in the network.

SUMMARY OF INVENTION

To improve the voice quality IP terminals, which endorse the ITU-T recommendation H.323 (ITU-T: International Telecommunication Union—Telecommunications Standardizations Sector) and what is referred to as the Direct Media Connection (DMC), communication payloads can be transmitted directly between the IP terminals while avoiding the gateways and thereby avoiding additional conversions and delays. In some cases it has continued to prove problematical that, with conventional DMC methods, when switching through the payload connection there is a delay before a definitive end-to-end connection is produced between the IP terminals, so with voice connections the start of a call is potentially not transmitted to a conversation partner.

An object of the invention is to disclose a method in which establishing of communication between two communication terminals in a packet-oriented communications network is improved. It is a further object of the invention to disclose a communications system and a communications terminal for carrying out the method.

This object is achieved by a method and by a communications system according to the independent claims.

Advantageous embodiments and developments of the invention are disclosed in the dependent claims.

In the method according to the invention, to establish communication, in particular of media such as voice, video, photos, fax or multimedia, in a packet-oriented communications network between a calling and a called terminal, before a call-accepted signal by the called terminal, triggered by a message within the framework of call set-up signaling, a direct, first payload connection is established between the calling and the called terminal. This accordingly established, first payload connection is maintained. As a direct result of the call-accepted signal of the called terminal communication is triggered between the calling and called terminals by means of the established first payload connection.

In the method according to the invention it is particularly advantageous that following initiation of a call set-up, the direct, first payload connection is established even before the call-accepted signal by the called terminal, so protracted establishment of a payload connection only when there is a call-accepted signal between the called and the calling terminals can be omitted. Since the first payload connection established for transmission of payload—for example a digitized and encoded voice—is on standby it may be ensured that the payload can be transmitted simultaneous with the call-accepted signal without there being any connection delays. In particular the method according to the invention can ensure that, by way of the called device, the supplied communication can be processed without delay with the call-accepted signal and can be transmitted to the calling terminal via the first payload connection already established, so the calling terminal can reach all of the communication incoming at the called terminal, without loss of an initial communication portion in an otherwise conventional time slot between call-accepted signal and switching-through of a payload connection. A gap in transmission of this kind or an excessive switch-through delay in payload transmission may therefore be avoided.

When applying the invention to a voice connection via telephone, immediately after the receiver of a called telephone, as the called terminal, is picked up therefore, the sounds arriving at the microphone are processed—i.e. are in particular encoded—by the called telephone, as communication according to the invention, and transmitted to a calling telephone as the calling terminal via the payload connection already maintained. An otherwise frequently occurring loss of a voice portion immediately after the receiver has been picked up is thereby avoided.

The call-accepted signal is in particular taken to mean actions which bring about acceptance of the signaled call set-up signaling for switching through the payload connection. With telephones this is in particular the action of taking up a receiver or pressing of a key. Alternatively acceptance of the incoming connection can be automatically triggered, without manual intervention, in other terminals such as fax machines.

A direct, first payload connection can be taken to mean a connection between two terminals which consists in particular in avoiding connection controllers such as gateways and/or gate keepers. In an advantageous embodiment of the invention this is for example a direct media connection, in particular according to Direct Media Connection (DMC) specifications. A connection via network elements which only carry out transportation of data at a low level of the OSI-reference model (OSI: Open Systems Interconnection) standardized by the ISO (International Organization for Standardization)—for example bridges, switches, routers, are to be regarded as a direct connection according to the invention. Depending on the embodiment it may also be provided, in addition to the direct, first payload connection, that an additional payload connection routed via connection controllers is established between the terminals.

In an advantageous development of the invention a connection controller, in particular a gatekeeper and/or a gateway, can be associated with the called and the calling terminals. Connection controllers of this type are for example provided to provide allocation of call numbers to IP addresses, with a respective connection controller only managing the terminals associated with it. The connection controllers may also be involved in signaling and in particular in call set-up signaling according to the invention. Within the framework of call set-up signaling the connection controllers can be involved in determining the codec (encoder/decoder) of the terminals and connection controllers that is to be used, the signaling path and the payload path in the communications network, encoding and/or further transmission parameters for the subsequent payload connection. A call set-up signaling path can run via a plurality of connection controllers as a function of the network structure and grouping of the terminal.

In a further advantageous development of the invention, before the call-accepted signal by the called terminal, triggered by a message within the framework of call set-up signaling, a second payload connection can be established between the called terminal and a connection controller—in particular a connection controller involved in call set-up signaling. The payload entering the calling terminal via the second payload connection is preferably processed at the calling terminal if there has been no call-accepted signal by the called terminal. With voice connections of the calling terminal this second payload connection can be used to transmit the ringing tone to indicate a clear or busy signal as an audible representation of the call status of the called terminal. The second payload connection can moreover be used to transmit announcements, option and/or input menus, generated by the connection controller or a further network node, to the calling terminal. In generalized terms and independently of the transmitted media type for the payload communication the second payload connection can be provided for transmission of additional communication between a connection controller and the calling terminal before the call-accepted signal by the called terminal, it being possible for the additional communication to be audio, video and/or multimedia information provided in a call set-up state, i.e. during call set-up and before the called terminal is answered, if generated by any desired network node that is different from the calling device.

In an advantageous embodiment, before the call-accepted signal between the calling terminal and the called terminal a direct signaling connection associated with the first payload connection can be established between the calling terminal and the called terminal, in particular via the same data path in the communications network as the first payload connection. This can be established in addition to further signaling actions running via connection controllers and can advantageously be used for signaling for a direct connection according to DMC (Direct Media Connection), the direct signaling connection and the direct, first payload connection representing the DMC connection after the call-accepted signal.

According to a further advantageous development of the invention, before the call-accepted signal by the called terminal, measures for call clearing suppression can be implemented by the calling terminal and/or the called terminal. This can therefore advantageously prevent the first payload connection from being cleared, even before the call-accepted signal owing to a conventional time allowance being exceeded—for example a maximum period of inactivity at a connection—, and therefore no longer being available for transmission of communication. In particular maintenance messages or packets, triggered by the call set-up signaling from the calling terminal to the called terminal, can be transmitted from the called terminal via the first payload connection to the calling terminal. A trigger time until a connection is cleared is also called a connection "time out" or is designated as the attainment of the maximum allowed "idle" time. The maintenance packets can be called "dummy", "keep alive" or "idle" packets and are transmitted by the called and/or the calling terminal. The respective receiving terminal can advantageously recognize on the basis of the content of an incoming packet whether it is a maintenance packet and in this case ignore or reject the contents. In an advantageous embodiment of the invention the calling terminal, induced by receipt of a maintenance packet, can transmit an additional maintenance packet or an acknowledgement conforming to protocol. The calling device can preferably transmit maintenance packets to the called terminal via the first payload connection provided only maintenance packets are received by the calling terminal via the first payload connection.

By recognizing a payload packet that differs from the maintenance packets and/or a payload packet implicitly indicating a call-accepted signal, owing to the start of a transmission of communication contents, at the called terminal, in an advantageous embodiment of the invention the calling terminal can recognize and/or determine the call-accepted signal of the called terminal with the aid of incoming payload packets via the first payload connection. This preferably takes place via a signaling connection without additional signaling, so advantageously only the first payload connection has to be monitored without additional connections of the calling terminal having to be observed. Since no separate signaling of the call-accepted signal is required existing protocols that are used do not need to be expanded for the invention. Delays through to transmission of the first payload packet to the calling terminal are also avoided, in particular if transmission of maintenance packets is terminated by the called terminal when it recognizes the call-accepted signal, and the pending payloads are transmitted immediately—in particular without further delay or explicit signaling—via the first payload connection.

Triggered by reception of a payload packet, indicating the call-accepted signal, at the calling terminal via the first payload connection, in an advantageous embodiment of the invention the call-accepted signal of the called terminal can be accepted by the calling terminal without acknowledgement by the payloads received via the first payload connection being processed in the calling terminal and being output at an output unit and in response thereto a message that is conventional in the connected state being transmitted to the called terminal. The calling terminal can also reject payload entering via the second payload connection and payload at the calling terminal can accordingly be transmitted via the first payload connection and no longer via the second payload connection. There is thus a changeover at the calling terminal from the second to the first payload connection without explicit signaling messages for announcing or triggering this changeover being sent or received via a signaling connection.

The above advantages, developments and embodiments apply analogously to the communications system according to the invention and to the communications terminal according to the invention in addition to applying to the method according to the invention.

BRIEF DESCRIPTION OF THE DRAWINGS

An exemplary embodiment of the invention will be described in more detail hereinafter with reference to the drawings, in which schematically:

FIG. 1 shows a communications system and a message flow and essential method steps within the framework of establishing communication in the communications system, and FIG. 2 shows a flow diagram of a calling and a called terminal in the communications system for establishing communication.

DETAILED DESCRIPTION OF INVENTION

Figure 1A:
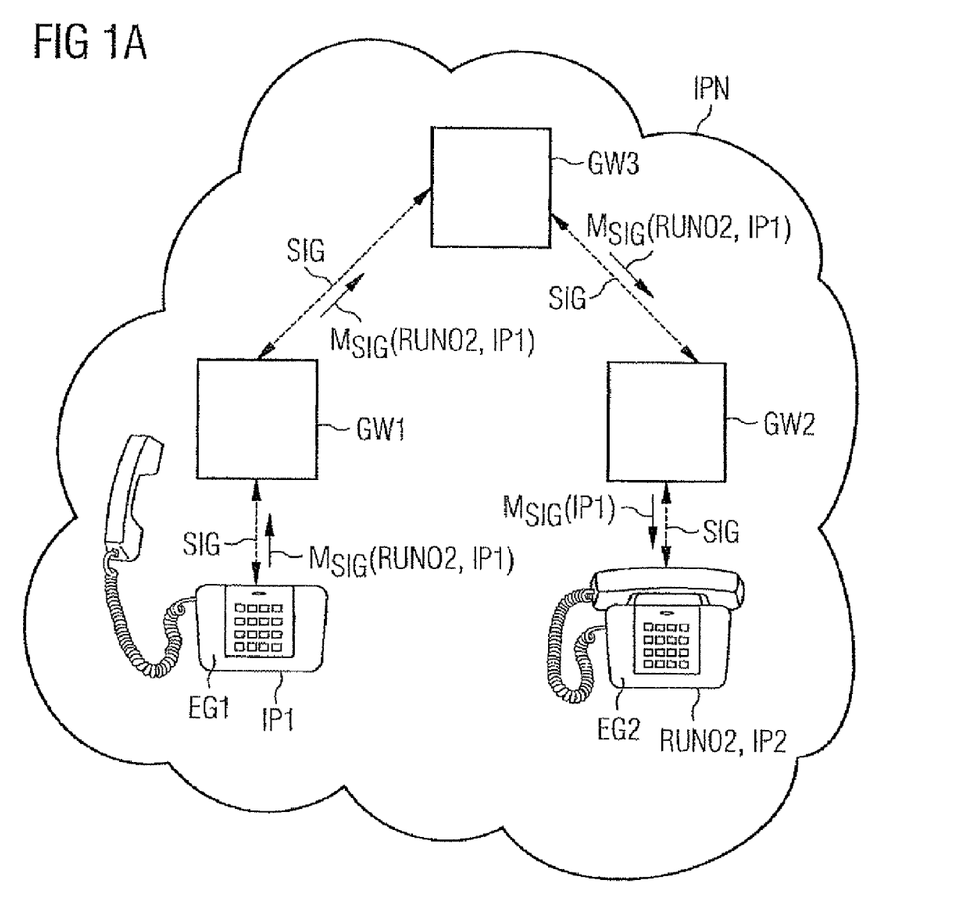
Figure 1B:
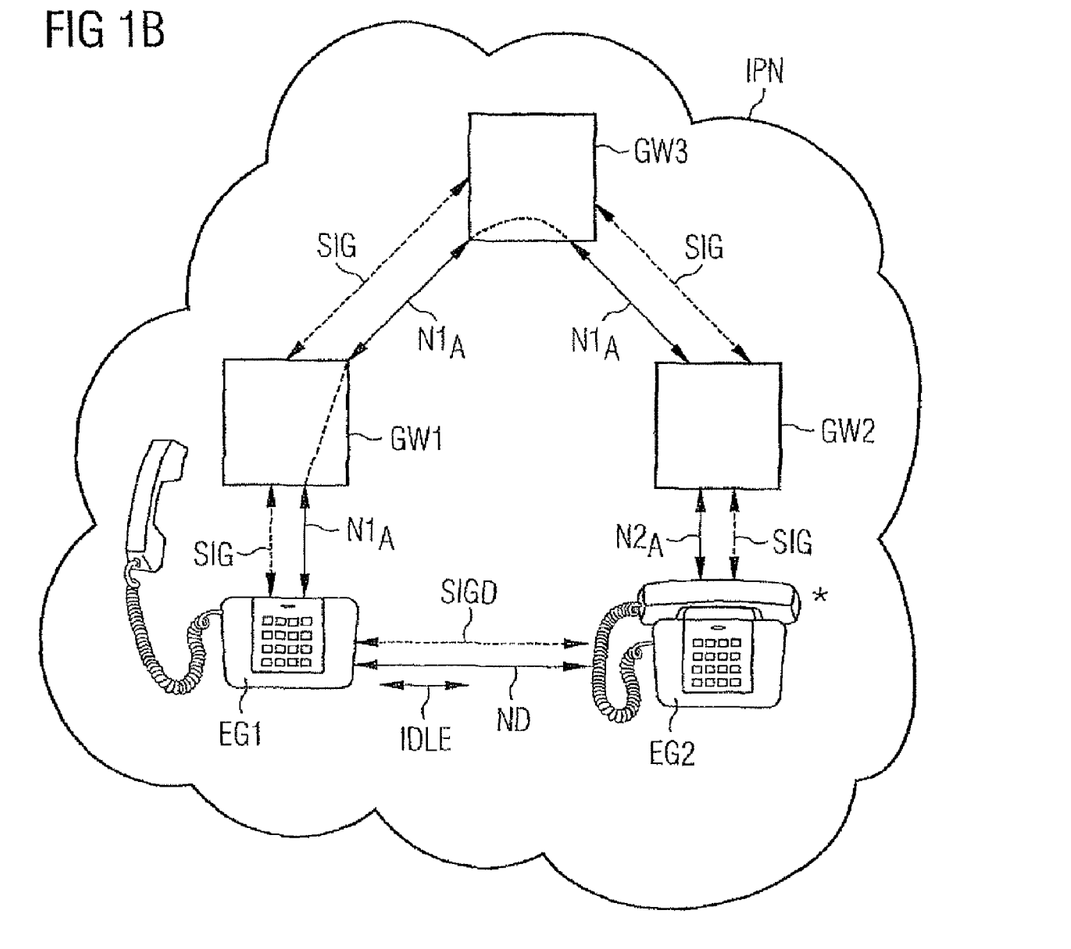
Figure 1C:
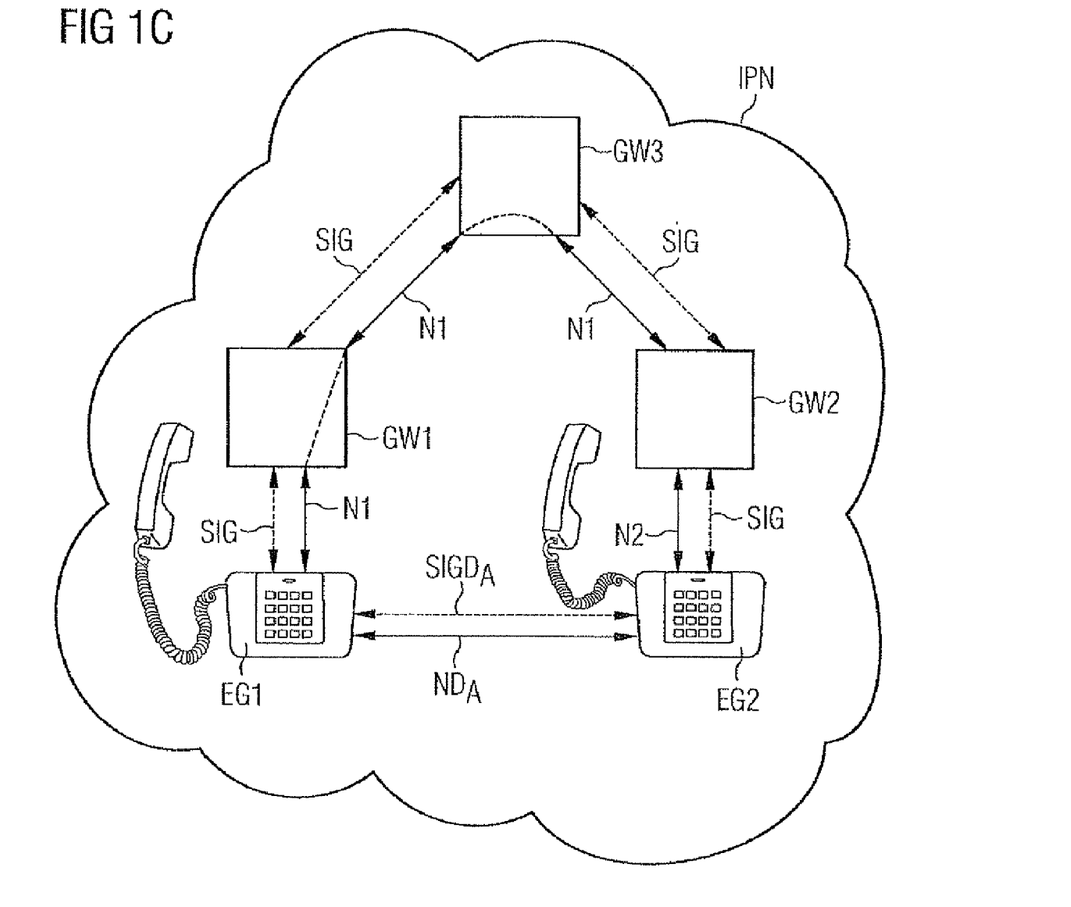

FIG. 1A to 1C schematically show the components of a packet-oriented communications system. The components are, in particular, a calling first terminal EG1, a called second terminal EG2 and three connection controllers GW1, GW2 and GW3. Said components are coupled via an IP network IPN as a packet-oriented communications network according to the invention, the messages and connections mentioned below being based on IP-based concepts. The terminals EG1 and EG2 are IP-based voice terminals and are visualized in FIGS. 1A to 1C as telephones. The connection controllers GW1, GW2, GW3 are shown as rectangles and in the present exemplary embodiment fulfill gateway and gatekeeper functionalities. This means in particular that, owing to the gatekeeper functionality, the respective terminals EG1, EG2 are allocated to a specific connection controller and, furthermore, the respective connection controller, owing to its gateway functionality, allows a transition between sub-networks of the packet-oriented communications system and a transition to line-oriented or other packet-oriented communications systems.

The communications system is configured in such a way that the first terminal EG1 is registered with the first connection controller GW1 and the second terminal EG2 with the second connection controller GW2. The first connection controller GW1 can moreover route connections to the third connection controller GW3 and this, owing to its configuration, can in turn transmit messages and connections to the second connection controller GW2 and to the first connection controller GW1. The second connection controller GW2 is configured in such a way that it can transmit messages to the third connection controller GW3. Direct communication between the first connection controller GW1 and the second connection controller GW2 should be possible via the IP network IPN, although it is assumed that the two connection controllers GW1 and GW2 are not reciprocally known, so a connection is in each case made via an intermediate connection controller—the third connection controller GW3 in this case.

IP addresses are allocated to all terminals and connection controllers shown in FIGS. 1A to 1C, with only the first IP address IP1 associated with the first terminal EG1 and the second IP address IP2 associated with the second terminal EG2 being shown. Furthermore the two terminals EG1 and EG2 have a call number for addressing in the voice communications system, only the call number RUN02 associated with the second terminal EG2 being shown in FIG. 1.

Directed messages are shown in FIG. 1 as directed arrows with arrow tip in the transmission direction and non-directed messages and connections are shown in the figures as double arrows. Signaling connections are shown in broken lines and payload connections in solid lines.

Establishment of voice communication between the calling first terminal EG1 and the called second terminal EG2 will be described hereinafter with reference to FIG. 1. Initial triggers in this connection are the lifting of the telephone receiver and dialing of the call number RUN02 at the first terminal EG1. Triggered thereby between the first terminal EG1 and the first connection controller GW1 is a signaling connection SIG for the purpose of setting up a call, within the framework of which a signaling message $M_{SIG}$ is transmitted from the first terminal EG1 to the first connection controller GW1. In particular the target call number RUN02 of the second called terminal EG2 and the transmission IP address IP1 of the first terminal EG1 are transmitted as the parameters. A signaling message $M_{SIG}$ of this type could for example be a setup message according to the ITU-T recommendation H.323 (ITU-T: International Telecommunication Union-Telecommunications Standardizations Sector) or an invite message according to the SIP protocol (SIP: Session Initiation Protocol) of the IETF workgroup (IETF: Internet Engineering Task Force).

The first connection controller GW1 then checks whether a terminal with the second call number RUN02 is registered with it. It is not in the present embodiment. The first connection controller GW1 then routes the call set-up signaling to the next configured routing node. This is the third connection controller GW3 in the present embodiment. In turn a signaling message $M_{SIG}$ is transmitted together with the target call number RUN02 and the transmission IP address IP1. In the present exemplary embodiment the target call number RUN02 is not registered with the third connection controller GW3 either. The third connection controller GW3 then transmits a query to further connection controllers and this includes in particular a query to the second connection controller GW2 (FIG. 1A shows only the query to the second connection controller GW2 by a signaling message $M_{SIG}$). A signaling connection is therefore established between the third connection controller GW3 and the second connection controller GW2 via which a signaling message $M_{SIG}$ is transmitted with said parameters.

The second connection controller GW2 checks the terminals registered with it and recognizes that, associated with call number RUN02, the second device EG2 is registered with it. The second connection controller GW2 determines the second IP address IP2 of the second terminal EG2 with the aid of call number RUN02 and internal configuration data. A signaling message $M_{SIG}$ is then sent to this IP address IP2 with the IP address IP1 of the first terminal EG1 as parameters. Signaling SIG is therefore continuously established from the first terminal EG1 via the connection controllers GW1, GW3 and GW2 to the second called terminal EG2. FIG. 1A does not show acknowledgements within the framework of signaling SIG for reasons of clarity. Owing to the incoming signaling SIG an incoming call is visually or acoustically signaled to a user of terminal EG2 at the second terminal EG2, in particular by ringing of the phone. FIG. 1B indicates this by a star next to the telephone receiver of the second terminal EG2.

A first payload connection N1 between the calling first terminal EG1 and the—from the perspective of the first terminal EG1—last, gateway in the chain of signaling SIG, i.e. the second connection controller GW2, and a payload connection N2 between the second connection controller GW2 and the called terminal EG2 will be established hereinafter. Both payload connections are active, and this is indicated in the drawings by a subscripted "A". The payload connection N1 as the second payload connection according to the invention is used in particular in this connection to generate and transmit to the first terminal EG1 the ringing tone in the receiver, so a user at the first terminal EG1 recognizes that the call request has been signaled through to the second terminal EG2. The payload connection N1 can, moreover, be used to transmit automatic announcements, to provide call centre option menus—for example by IVR systems (IVR: Interactive Voice Response), voice and/or key actions carried out at the first terminal EG1 being transmitted to the connection controller GW2 via the payload connection N1.

Also triggered by the signaling message $M_{SIG}$ entering within the framework of call set-up signaling at the called second terminal EG2, even before the call-accepted signal by the called terminal EG2, is the establishment of a direct signaling connection SIGD and a direct payload connection ND as the first payload connection according to the invention, in each case as a direction connection to the first terminal EG1. A direct connection in this connection is a connection which is not routed via the connection controllers GW1, GW2, GW3, it being possible however to provide known network nodes such as routers, switches, bridges and firewalls in the transmission path of the direct connections SIGD, ND for packet-oriented transmission if they do not carry out any kind of voice conversions or other time-consuming processing operations of data packets of the connections SIGD, ND. The direct connection is established in this case with the aid of the first IP address IP1 transferred to the second terminal EG2, network address conversions between various sub-networks being ignored in the present exemplary embodiment. The direct connection may also be established by depending on or using known DMC method steps for direct media communication.

The established connections SIGD, ND are maintained for subsequent, rapid switching-through of the communication between the second terminal EG2 and the first terminal EG1 after the call has been accepted by the second terminal EG2. Time-consuming connection establishment steps, such as the exchange of codes and/or certificates for secured, subsequent communication, are carried out as early as when the signaling connection SIGD and the direct payload connection ND are established. The first terminal EG1 is actively involved in the direct establishment of the signaling connection SIGD and payload connection ND, data transmission via the connections SIG and N1 already established not being affected thereby.

Maintenance packets IDLE conforming to protocol will be transmitted hereinafter between the called second terminal EG2 and the calling terminal EG1 via the direct payload connection ND, so the direct payload connection ND, despite apparent inactivity, is not automatically cleared but is maintained. The calling first terminal EG1 is accordingly configured in such a way that, while it manages the payload connection N1 it analyses incoming data packets via the direct payload connection ND. The incoming data packets are analyzed in this connection such that the first terminal EG1, with the aid of the incoming packets, recognizes whether the incoming data packets are still maintenance packets IDLE for call clearing suppression or are already valid payload packets following a call-accepted signal by the second terminal EG2.

Reception of maintenance packets IDLE in the first terminal EG1 means that the received maintenance packets IDLE are ignored and/or maintenance packets IDLE are also transmitted via the direct payload connection ND to the called terminal EG2. A call-accepted signal by the called terminal EG2 would, moreover, be recognized at the first calling terminal EG1 by a data packet, which differs from a maintenance message or a maintenance packet IDLE, arriving via the direct payload connection ND. This is described in more detail hereinafter with reference to FIG. 1C.

Lifting of the telephone receiver of the second terminal EG2, indicated in FIG. 1C, causes acceptance of the call by the second terminal EG2. As a direct result of this call-accepted signal at the second terminal EG2 the communication pending at the microphone of the telephone receiver of the second terminal EG2 is processed in the second terminal EG2. Without explicit signaling via one of the signaling connections SIG or SIGD—wherein explicit signaling of the call-accepted signals by means of SIG and/or SIGD may also be provided in alternative embodiments to communicate the call-accepted signal of the second terminal EG2 even if the microphone of the first terminal EG1 is muted, or to ensure correct detection for determining call charges—the incoming communication is digitized by the second terminal EG2 and transmitted via the direct payload connection ND to the calling first terminal EG1, with transmission of maintenance packets IDLE to the second terminal EG2 being terminated. The arrival of a payload packet of this type, which differs from maintenance packets IDLE, at the calling first terminal EG1 means that the call-accepted signal of the second terminal is recognized by the first. This call-accepted signal is, moreover, implicitly accepted, i.e. without transmission of an acknowledgement or confirmation, by the first terminal EG1 in that the payload incoming via the direct payload connection ND is processed immediately—without any further signaling—, and is output via the associated telephone receiver of the first terminal EG1. The payload connection N1 between the calling terminal EG1 and the second connection controller GW2 is furthermore switched so as to be inactive in that no further packets that differ from maintenance packets IDLE are transmitted by the calling terminal EG1 via this connection. Sounds and/or speech received via the telephone receiver of the first terminal EG1 are no longer transmitted via the payload connection N1 from this point in time either but via the direct payload connection ND, without additional signaling having been carried out. Payload packets entering via the payload connection N1 are rejected by the first terminal EG1.

Rapid switching-through of a communication is thus possible via a direct payload connection ND. A loss of payload packets or a communication at a telephone receiver can thus be avoided. This is particularly advantageous if the second terminal EG2 is a device for automatic announcements or is a fax machine or modem. The latter devices conventionally have the property of transmitting payloads very quickly after signaled call acceptance, so loss of these payloads would have an adverse effect. In particular the loss of fax or modem payloads could prevent connection establishment or make it impossible. This may be prevented by the presented method because directly after the call-accepted signal the pending communication is transmitted without losses and without delay to the calling terminal EG1.

The existing payload connections N1 and N2 and the signaling connections SIG which run via the connection controllers GW1, GW2, GW3, can continue to be maintained or alternatively (not shown) be cleared within the framework of further signaling messages. If these connections are not cleared it is provided in the case of both terminals EG1 and EG2 that packets entering via these connections are ignored.

The terminals EG1, EG2 shown in FIG. 1 and the illustrated communications system structure should be regarded merely as examples in this connection. A generalization compared with any desired terminals and any desired topology as well as any desired communications protocol is easily possible without limiting the disclosure of the invention.

Figure 2A:
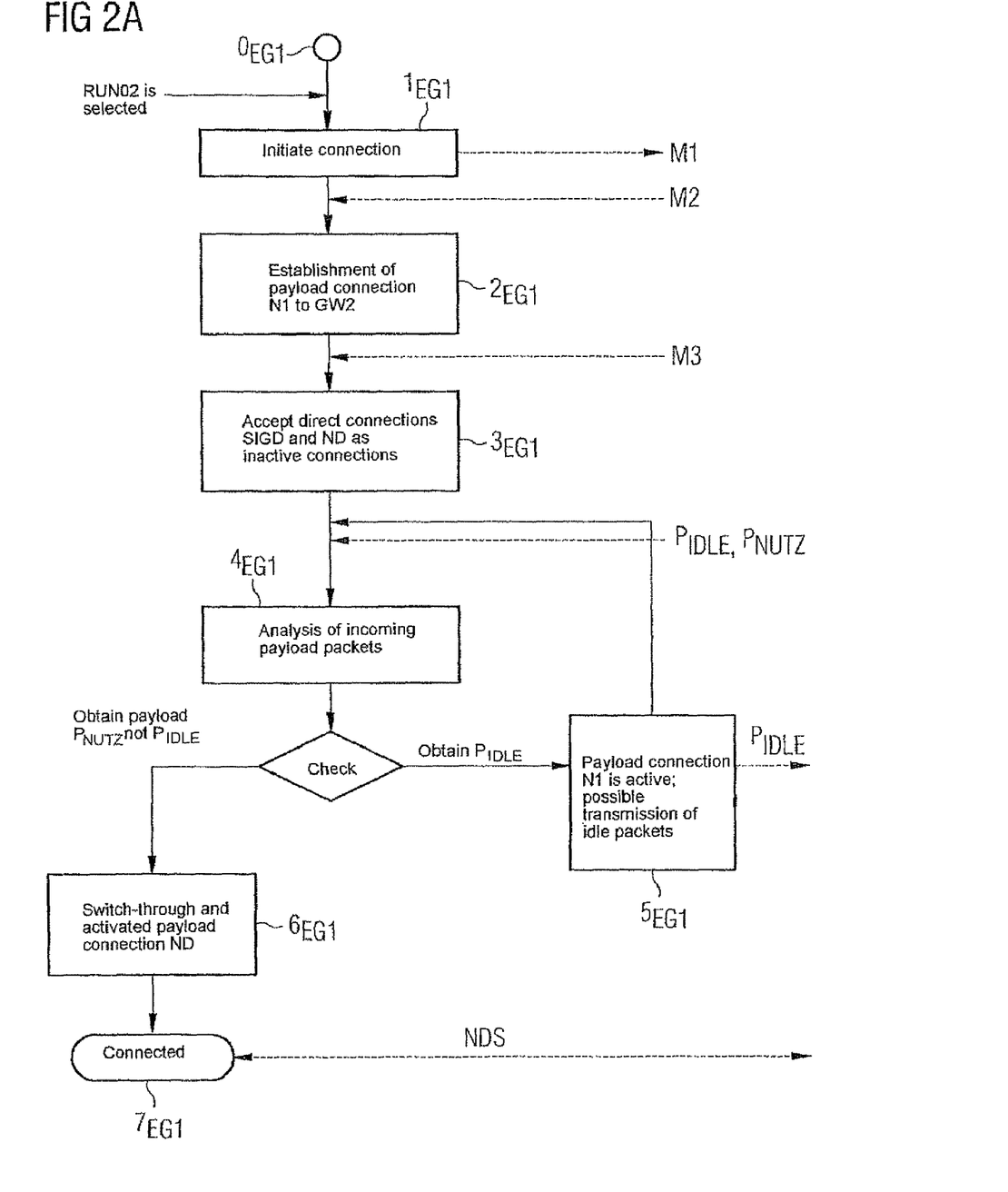
Figure 2B:
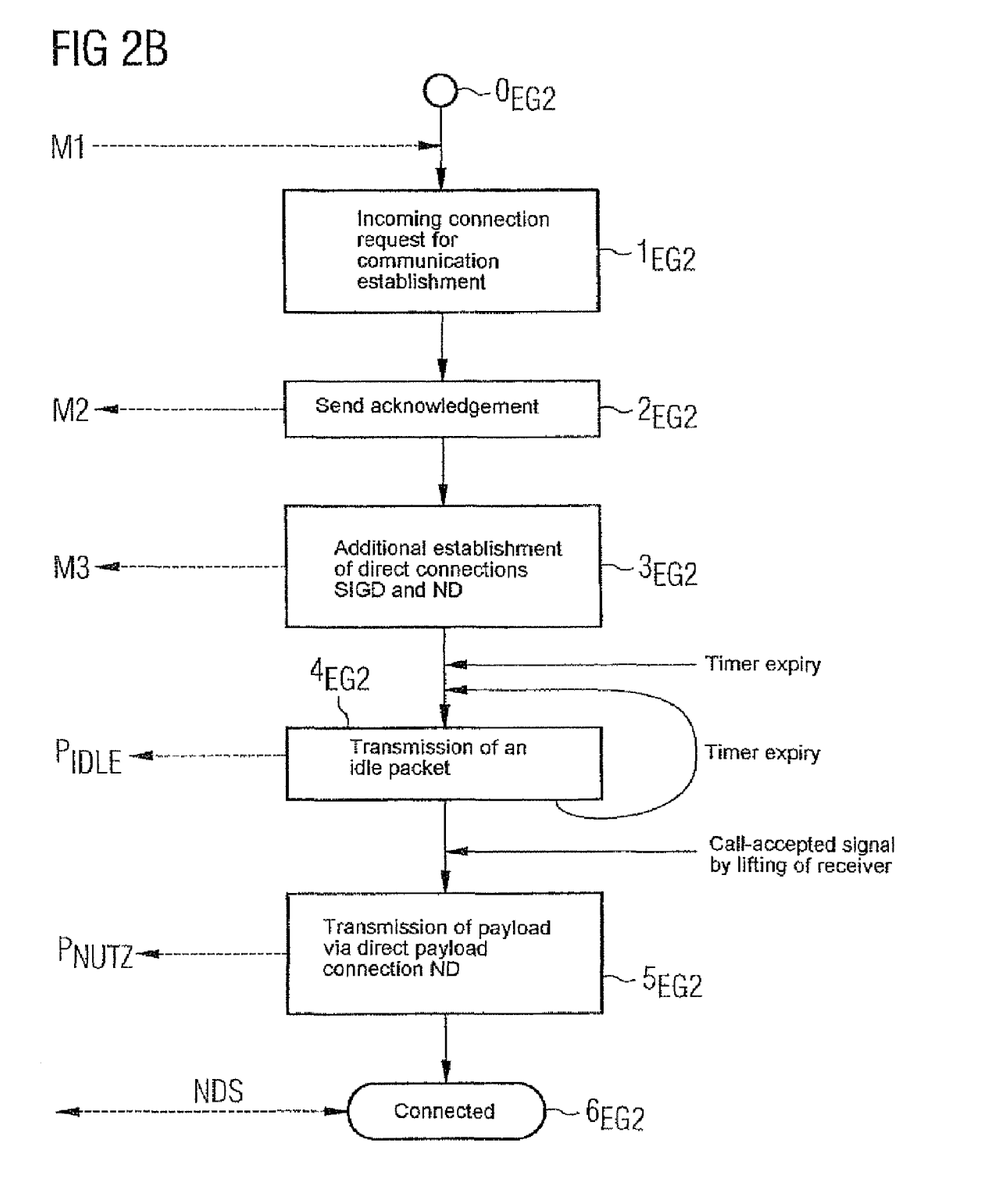

FIG. 2 will hereinafter describe a respective state transmission diagram for the calling terminal EG1 and the called terminal EG2 according to the method steps illustrated with reference to FIG. 1. The state transitions are described, with reference to their course over time, jointly for the calling and the called terminal EG1, EG2, respective state transition diagrams being shown separately from each other for the calling terminal EG1 in FIG. 2A and for the called terminal EG2 in FIG. 2B. The starting situation for the calling terminal EG1 is a rest state $0_{EG1}$, and likewise a rest state $0_{EG1}$ for the called terminal EG2.

Triggered by dialing of the call number RUN02 at the first terminal EG1, the first terminal EG1 changes into an initialization state for the connection to be established (state $1_{EG1}$). Triggered as a result, a signaling message M1 is transmitted to the called terminal EG2. The transmission takes place in particular via a plurality of connection controllers, with these not being shown in FIG. 2. Receipt of the signaling message M1 causes the called terminal EG2 to leave its rest state and to change into the state $1_{EG2}$ in which steps are carried out which are executed in the case of an incoming connection request. In state $2_{EG2}$ the called terminal EG2 transmits a response belonging to message M1 via the same signaling path with the aid of signaling message M2. The calling terminal EG1 then changes its state to the state $2_{EG1}$ which establishes a payload connection to a connection controller involved in message traffic. The called terminal EG2 passes immediately from state $2_{EG2}$ to state $3_{EG2}$ in that an additional direct signaling and payload connection is established. For this purpose a signaling message M3 is transmitted to the calling terminal EG1 and first packets via the direct payload connection (hereinafter designated "ND" according to the designation in FIG. 1).

In a modification of the method the first terminal EG1 could also initiate the direct payload connection ND. This is especially possible if an IP address of the second terminal EG2 is transmitted as a parameter of the signaling message M2.

Triggered by reception of this signaling message M3, the calling terminal EG1 changes its state (new state $3_{EG1}$) and accepts the incoming direct connections—the direct signaling connection SIGD and the direct payload connection ND—from the called terminal EG2. The calling terminal EG1 also immediately changes to state $4_{EG1}$ in which incoming packets, which arrive via the direct payload connection ND at the calling terminal EG1, are analyzed. The called terminal EG2 changes owing to timer expiry from the state $3_{EG2}$ to the state $4_{EG2}$ and in this state sends a maintenance packet as a payload packet $P_{IDLE}$ with only "dummy" content to the calling terminal EG1 via the direct payload connection ND.

In the still active state $4_{EG1}$ the calling terminal EG1 analyses this incoming payload packet. If it is a maintenance packet the calling terminal EG1 changes to state $5_{EG1}$ and as a result causes the direct payload connection ND to continue not to be activated, and instead maintenance payload packets $P_{IDLE}$ are transmitted via the direct payload connection ND, starting from the calling terminal EG1. With renewed timer expiry at the called terminal EG2 this procedure is repeated again, so a maintenance payload packet $P_{IDLE}$ is transmitted again to the calling terminal EG1 and is analyzed therein analogously to the above-mentioned steps. This process is repeated until either the calling terminal EG1 terminates its call set-up request, until there is a call-accepted signal at the called terminal EG2—in particular by lifting of a telephone receiver—or until one of the connection controllers involved initiates termination of the connection.

Triggered by a call-accepted signal of this type, the called terminal EG2 changes from the state $4_{EG2}$ to state $5_{EG2}$. In this state pending communication data is converted directly into payload and transmitted via the direct payload connection ND to the calling terminal EG1 by means of filled payload packets $P_{NUTZ}$. Sending of filled payload packets $P_{NUTZ}$ is continued until the call is terminated in a known manner—for example by replacing the receiver. Before arrival of the first filled payload packet $P_{NUTZ}$ the calling terminal EG1 is still in the state $4_{EG1}$ in which incoming payload packets are analyzed via the direct payload connection ND. If a filled payload packet $P_{NUTZ}$ accordingly reaches the calling terminal EG1, this recognizes the receipt of a valid payload packet $P_{NUTZ}$ that describes a call-accepted signal and changes to state $6_{EG1}$ in which the connection, and therefore the communication to be transmitted, is switched through to the input/output device (i.e. the telephone receiver) of the calling device EG1. In this state the calling terminal EG1 processes incoming payload packets $P_{NUTZ}$ which arrive via the direct payload connection ND and sends its own payload packets to the called terminal EG2 via this direct payload connection ND.

Both terminals EG1, EG2 can therefore change over into a connected state—states $7_{EG1}$ or $6_{EG2}$—in which a payload stream NDS of payload packets is exchanged via the direct payload connection ND. Further steps, such as execution of specific features or, subsequently, call clearing, are accordingly possible. These steps are not described in more detail in the illustrated FIGS. 2A and 2B, however.

The states shown in FIG. 2 illustrate a largely simplified depiction of a connection establishment according to the invention. For example communication between a connection controller and the first terminal EG1 has been omitted for reasons of clarity. Observation of this connection would therefore have led to payload packets arriving at the first terminal EG1 being rejected by a connection controller in state $6_{EG1}$. In states $2_{EG1}$ to $5_{EG1}$ on the other hand incoming payload packets would be processed by a connection controller via the first terminal EG1.

The method steps shown with reference to FIGS. 1 and 2 are advantageous insofar as the method allows rapid and loss-free changeover between an existing payload connection and an already established, but not yet active payload connection. This is particularly advantageous if, owing to time-consuming and complex call set-up methods a connection establishment of a payload connection is completed comparatively slowly, so without employing the invention recommended maximum switch-through delays—for example 250 ms maximum delay—recommended by the ITU-T, cannot be observed.

It is also advantageous that integration in existing implementations of protocols and transmission methods is easily possible since only minor modifications are necessary.

Known methods may also be used for signaling and the payload connection. These are, in particular, method steps according to H.323, SIP, a transmission of payload packets according to RTP (Real-time Transport Protocol) and/or other standards or implementations. The method can advantageously be applied to all IP-based communications systems which are provided for real-time-critical transmission of flows of media—for example within the framework of Voice-over-IP or Multimedia-over-IP. Although in the present exemplary embodiment only packet-based connections are used, individual signaling portions between the connection controllers for example can also be carried out by line-based communication segments.

The invention claimed is:

1. A method for establishing communication in a packet-oriented communications network between a calling terminal and a called terminal, the network comprising a plurality of connection controllers for connecting the calling terminal to the called terminal, the connection controllers comprising a first connection controller and a second connection controller, the method comprising:
the calling terminal initiating a sending of a signaling message from the first connection controller to the called terminal to establish a first payload connection between the called terminal and the first connection controller such that data is transmittable between the calling terminal and the called terminal via a communication path defined by at least the first and second connection controllers;
the first connection controller sending the signaling message to the called terminal, the signaling message comprising a parameter identifying an address of the calling terminal;
the called terminal receiving the signaling message from the first connection controller;
before generating a call-accepted signal, the called terminal establishing a direct payload connection between the called terminal and the calling terminal, the direct payload connection not including any connection controller within a path of communication defined by the direct payload connection;
establishing a direct signaling connection between the calling terminal and the called terminal prior to sending the call-accepted signal, the direct signaling connection associated with the direct payload connection;
transmitting maintenance packets between the called terminal and the calling terminal to maintain the direct payload connection prior to a transmission of data packets between the calling terminal and the called terminal; and
transmitting the data packets via the direct payload connection between the called terminal and the calling terminal, the transmitting of the data packets between the calling terminal and the called terminal placing the direct payload connection in an active state.

2. The method of claim 1 wherein the transmitting of data packets is a transmission of data packets comprising digitized voice data.

3. The method of claim 1 further comprising the called terminal transmitting the call-accepted signal and the called terminal implementing a call clearing suppression prior to sending the call-accepted signal.

4. The method of claim 3 wherein the call clearing suppression is configured such that the maintenance packets are transmitted between the calling and the called terminal.

5. The method of claim 4 wherein the calling terminal recognizes the call-accepted signal of the called terminal by a first reception of data packets comprising at least a portion of the data packets transmitted via the direct payload connection.

6. The method of claim 5 wherein the calling terminal checks, until the call-accepted signal of the called terminal is recognized at the calling terminal, whether a packet entering via the direct payload connection is one of the maintenance packets and the data packets.

7. The method of claim 4 wherein triggered by the call-accepted signal, the called terminal terminates transmission of the maintenance packets in response to recognizing the call accepted signal.

8. The method of claim 3 wherein in response to the call-accepted signal by the called terminal:
transmitting a payload comprising at least a portion of data packets via the direct payload connection or stopping a signaling of the call-accepted signal.

9. The method of claim 1 further comprising:
the calling terminal accepting the call-accepted signal of the called terminal without acknowledgement, or
the calling terminal rejecting data arriving via a second payload connection formed between the calling terminal and a second one of the connection controllers, the second payload connection formed such that data is transmittable between the calling terminal and the called terminal via the communication path defined by at least the first and second connection controllers.

10. The method of claim 1 wherein the called terminal establishing the direct payload connection between the called terminal and the calling terminal by using the parameter of the signaling message.

11. The method of claim 1 wherein the connection controllers comprise at least one of gatekeepers and gateways.

12. The method of claim 1 wherein the connection controllers provide gatekeeper functionality and gateway functionality.

13. The method of claim 1 further comprising the calling terminal changing over to the direct payload connection without signaling messages for announcing or triggering the changing over.

14. A communications system for establishing communication in a packet-oriented communications network comprising:
a calling terminal;
a called terminal;
a plurality of connection controllers comprising a first connection controller and a second connection controller, the first connection controller having a first payload connection to the calling terminal and the second connection controller having a second payload connection to the called terminal, the first and second payload connections at least in part defining a communication path through which data for a communication is transmittable between the calling terminal and the called terminal;
the second connection controller sending a signaling message to the called terminal to establish the second payload connection, the signaling message comprising a parameter identifying an address of the calling terminal;
the called terminal receiving the signaling message from the second connection controller;
before generating a call-accepted signal, the called terminal establishing a direct payload connection between the called terminal and the calling terminal, the direct payload connection not including any of the connection controllers within a path of communication defined by the direct payload connection;
a direct signaling connection being established between the calling terminal and the called terminal prior to sending the call-accepted signal, the direct signaling connection associated with the direct payload connection;
maintenance packets being transmitted between the called terminal and the calling terminal to maintain the direct payload connection prior to a transmission of data packets between the calling terminal and the called terminal; and data packets for the communication being sent via the direct payload connection between the called terminal and the calling terminal, the transmission of the data packets between the calling terminal and the called terminal via the direct payload connection placing the direct payload connection in an active state.

15. The system of claim 14 wherein the direct payload connection is maintained by sending maintenance packets via the direct payload connection until a first data packet of the data packets is transmitted over the direct payload connection.

16. The system of claim 14 wherein the calling terminal is a telephone and the called terminal is a telephone.

17. A communications terminal for establishing communication in a packet-oriented communications network, comprising:

a direct payload connection established between the terminal and a calling terminal in response to receiving a call set-up signaling message and prior to sending a call-accepted signal, the direct payload connection not including any connection controller within a path of communication between the terminal and the calling terminal defined by the direct payload connection;

a communication between the terminal and the calling terminal via of the established direct payload connection triggered in response to the call-accepted signal, the communication comprising data packets being transmitted to at least one of the terminal and the calling terminal; and a direct signaling connection between the calling terminal and the terminal prior to sending the call-accepted signal, the direct signaling connection associated with the direct payload connection;

maintenance packets being transmitted between the terminal and the calling terminal to maintain the direct payload connection prior to the transmission of the data packets between the calling terminal and the terminal; and wherein the transmitting of the data packets between the calling terminal and the terminal via the direct payload connection places the direct payload connection in an active state.

18. The terminal of claim 17 wherein the calling terminal is a telephone and the terminal is a telephone.

\* \* \* \* \*